United States Patent
Machida

(10) Patent No.: US 7,167,279 B2
(45) Date of Patent: Jan. 23, 2007

(54) IMAGE FORMING APPARATUS

(75) Inventor: Hironobu Machida, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 891 days.

(21) Appl. No.: 10/140,290

(22) Filed: May 8, 2002

(65) Prior Publication Data

US 2003/0210437 A1    Nov. 13, 2003

(51) Int. Cl.
*H04N 1/21* (2006.01)
*H04N 1/23* (2006.01)

(52) U.S. Cl. ............. 358/296; 358/448; 358/451; 382/312; 382/243

(58) Field of Classification Search ........... 382/312, 382/243, 232, 297; 358/426–427, 505, 296, 358/448, 451, 294, 405, 406, 434, 443, 444, 358/400; 399/53–54, 227
See application file for complete search history.

(56) References Cited

U.S. PATENT DOCUMENTS

| 5,452,102 A | * | 9/1995 | Yokoyama et al. ......... 382/243 |
| 5,508,810 A | | 4/1996 | Sato |
| 6,023,537 A | * | 2/2000 | Wada et al. ............... 382/312 |

FOREIGN PATENT DOCUMENTS

JP            5-110814        4/1993

* cited by examiner

*Primary Examiner*—Thomas D. Lee
*Assistant Examiner*—Heather D Gibbs
(74) *Attorney, Agent, or Firm*—Foley & Lardner LLP

(57) ABSTRACT

Detection of the direction of an original is effected not at the time of scanning the original, but at the time of standby for the start of printing. Thereby, the scanning performance is prevented from deteriorating.

20 Claims, 11 Drawing Sheets

FIG. 5

| Main scan | Longitudinal | | | | | | | | | | | | | | | |
|---|---|---|---|---|---|---|---|---|---|---|---|---|---|---|---|---|
| Obverse-page character direction | Up | | | | Down | | | | Right | | | | Left | | | |
| Obverse-page horizontal description / vertical description | Horizontal description | | Vertical description | | Horizontal description | | Vertical description | | Horizontal description | | Vertical description | | Horizontal description | | Vertical description | |
| Reverse-page character direction | Down | Up | Up | Down | Up | Down | Down | Up | Right | Left | Right | Left | Right | Left | Right | Left |
| Obverse-page rotating process | 0 | 0 | 0 | 180 | 0 | 180 | 180 | 0 | 0 | 180 | 0 | 0 | 180 | 180 | 180 | 180 |
| Reverse-page rotating process | 0 | 180 | 180 | 0 | 180 | 0 | 0 | 180 | 180 | 0 | 180 | 0 | 0 | 180 | 0 | 180 |
| Binding direction discrimination | Left-hand binding | Top binding | Right-hand binding | Top binding | Top binding | Left-hand binding | Top binding | Right-hand binding | Left-hand binding | Top binding | Right-hand binding | Top binding | Top binding | Left-hand binding | Top binding | Right-hand binding |
| Obverse-page 2-in-1 arrangement | Up | | | | Up | | | | Up | | Down | | Up | | Down | |
| Reverse-page 2-in-1 arrangement | Down | | | | Down | | | | Down | | Up | | Down | | Up | |

| Main scan | Longitudinal | | | | | | | | | | | | | | | |
|---|---|---|---|---|---|---|---|---|---|---|---|---|---|---|---|---|
| Obverse-page character direction | Up | | | | Down | | | | Right | | | | Left | | | |
| Obverse-page horizontal description/vertical description | Horizontal description | | Vertical description | | Horizontal description | | Vertical description | | Horizontal description | | Vertical description | | Horizontal description | | Vertical description | |
| Reverse-page character direction | Up | Down | Up | Down | Up | Down | Up | Down | Right | Left | Right | Left | Right | Left | Right | Left |
| Obverse-page rotating process | 0 | 0 | 0 | 0 | 180 | 180 | 180 | 180 | 0 | 0 | 0 | 0 | 180 | 180 | 180 | 180 |
| Reverse-page rotating process | 0 | 180 | 0 | 180 | 180 | 0 | 180 | 0 | 0 | 180 | 0 | 180 | 180 | 0 | 180 | 0 |
| Binding direction discrimination | Top binding | Left-hand binding | Top binding | Right-hand binding | Left-hand binding | Top binding | Right-hand binding | Top binding | Left-hand binding | Top binding | Right-hand binding | Top binding | Top binding | Left-hand binding | Top binding | Right-hand binding |
| Obverse-page 2-in-1 arrangement | Left | | Right | | Left | | Right | | Right | | | | Left | | | |
| Reverse-page 2-in-1 arrangement | Right | | Left | | Right | | Left | | Left | | | | | | | |

FIG. 6

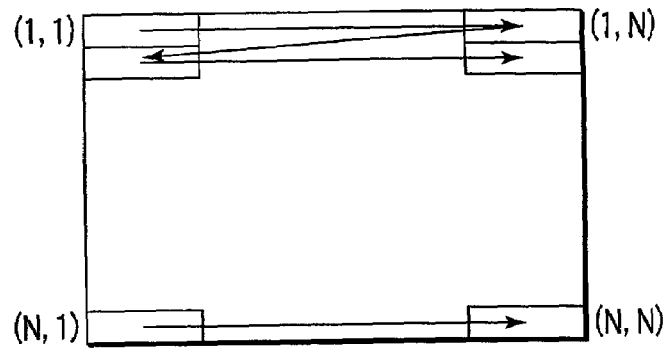
F I G. 10
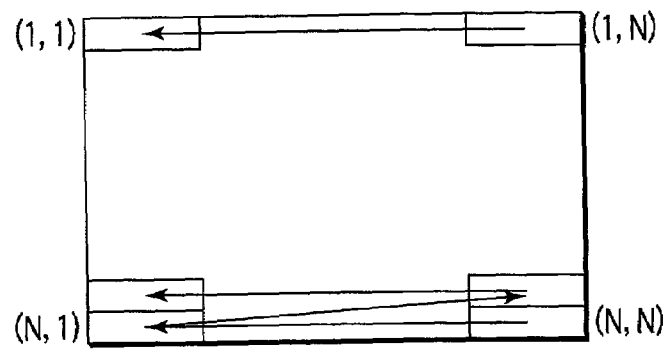
F I G. 11
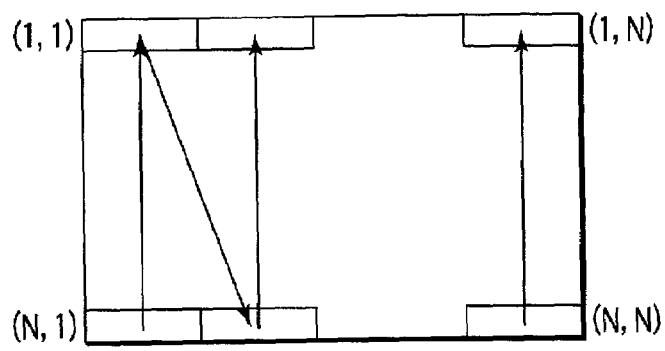
F I G. 12
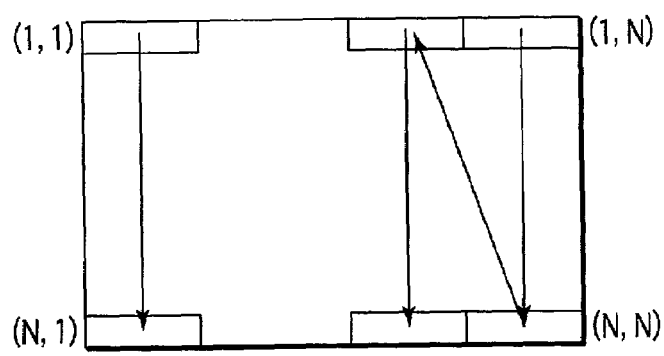
F I G. 13

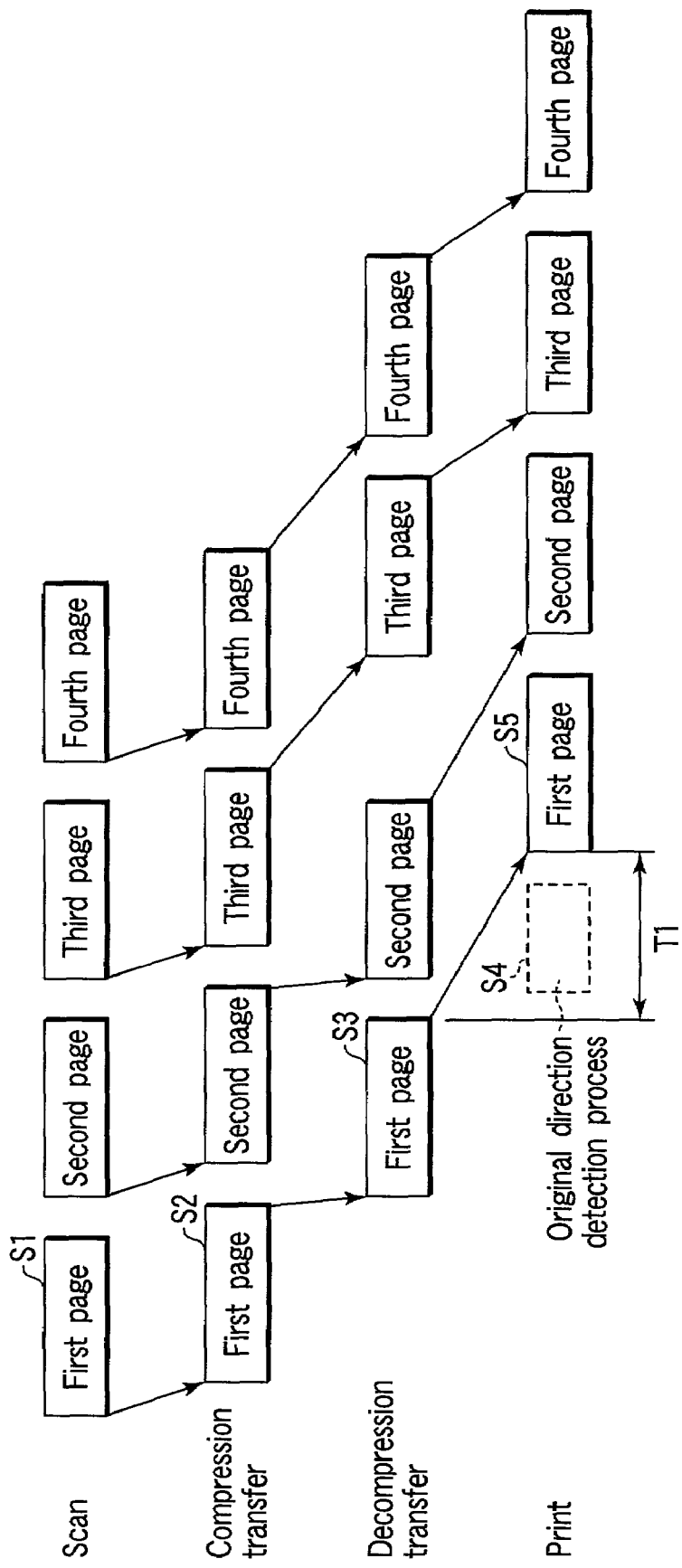
F I G. 14

IMAGE FORMING APPARATUS

BACKGROUND OF THE INVENTION

The present invention relates to an image forming apparatus for outputting a copy image by printing an image of an original on a paper sheet with use of an OA (Office Automation) apparatus such as a copying machine.

In the prior art, the direction of originals is detected for the individual originals one by one. The longitudinal direction and the transverse direction of each original are detected for automatic selection of paper sheets.

However, in the 2-in-1 printing mode in which images on both sides of an original are printed on one side of a paper sheet using an ADF (Automatic Document Feeder), the up-and-down direction of the image corresponding to the obverse side of the original may become opposite to the up-and-down direction of the image corresponding to the reverse side of the original, depending on the direction in which the original is set on the original table.

For example, in the case of printing of both sides of an original with the setting of "A4, portrait, horizontal description" and "binding in longitudinal direction", when an original is set in the direction of A4, images corresponding to the images on both sides of the original are arranged on the right and left parts of a paper sheet in the same up-and-down direction. However, when an original is set in the direction of A4-R (Reduction), the up-and-down direction of the image corresponding to the obverse side of the original is opposite to the up-and-down direction of the image corresponding to the reverse side of the original.

On the other hand, in the case of printing of both sides of an original with the setting of "A4, landscape, horizontal description" and "binding in transverse direction", when an original is set in the direction of A4-R, images corresponding to the images on both sides of the original are arranged on the right and left parts of a paper sheet in the same up-and-down direction. However, when an original is set in the direction of A4, the up-and-down direction of the image corresponding to the obverse side of the original is opposite to the up-and-down direction of the image corresponding to the reverse side of the original.

Whether the image on the obverse side of an original and the image on the reverse side of the original are arranged on the left and right parts of a paper sheet or on the right and left parts of the paper sheet varies depending on whether the images on the original are horizontal description or vertical description. Since this setting by the user is time-consuming, there is a proposal that characters extracted from the original are recognized to determine the up-and-down direction of the original and to automatically set the up-and-down direction of the original.

The portrait of the horizontally positioned original is defined such that the longitudinal direction of the original coincides with the up-and-down direction of the image. The landscape of the horizontally positioned original is defined such that the transverse direction of the original coincides with the up-and-down direction of the image.

The setting of an original in the direction of A4 is defined such that the convey direction of an A4-sized document is perpendicular to the longitudinal direction of the original, and the main scan direction of the original by the scanner coincides with the longitudinal direction of the original.

The setting of an original in the direction of A4-R is defined such that the convey direction of an A4-sized document is perpendicular to the transverse direction of the original, and the main scan direction of the original by the scanner coincides with the transverse direction of the original.

Accordingly, character recognition is indispensable for both-side copying of an original without a user's time-consuming procedure. Although there are some patents relating to the method of determining the up-and-down direction of originals using character recognition, these are based on the technique wherein character recognition is made at the time of inputting all originals. Since a considerable length of time is needed for character recognition, there is a problem that the copying performance will greatly deteriorate due to the character recognition of all originals.

In order to solve this problem, there is a proposal which pays attention to the fact that in most cases the up-and-down directions of originals to be used by the user are identical. In this proposal, character recognition for only the first of the originals is effected. Based on the character recognition of the first original, a rotational process and an arrangement process at the time of input of originals are determined. No character recognition is performed for the second and following originals, and these originals are uniformly subjected to the processes determined in connection with the first original. Thereby, the deterioration in copying performance is reduced.

However, since the character recognition is performed at the time of inputting the first original, the start of the input process for the next original will disadvantageously delay, and deterioration in scan performance will be caused.

For example, as shown in FIG. 1, after a first original has been scanned, a process of detecting the direction of the first original is performed. Consequently, an unnecessary time interval of 1 to 2 seconds exists between the scan of the first original and the scan of the second original.

BRIEF SUMMARY OF THE INVENTION

The object of the present invention is to provide an image forming apparatus wherein directions of a plurality of originals are determined on the basis of a direction of described characters on at least a first one of the originals, which are recognized by a character recognition process, and an image forming process is performed on the basis of the determined directions of the originals. In this apparatus, the direction of the original can be determined by the character recognition process during the standby time between the completion of the process of scanning the first original and the start of the image formation by an image forming unit. Thus, an interval between an image formation instruction and the start of an image forming process can be effectively used, and the scanning performance is prevented from deteriorating.

In order to achieve the object, this invention may provide an image forming apparatus comprising:

a scanner unit which successively scans image data of each of a plurality of originals;

a compression section which compresses the image data scanned by the scanner unit;

a hard disk which stores the image data compressed by the compression section;

a decompression section which decompresses the image data stored in the hard disk;

a detection section which detects the direction of the original on the basis of the image data of a first one of the originals, which has been decompressed by the decompression section and scanned by the scanner section;

a determination section which determines whether the image data decompressed by the decompression section is to be rotated or not, on the basis of a detection result of the detection section;

a rotating section which rotates the image data of each original decompressed by the decompression section, when the determination section has determined that the image data decompressed by the decompression section is to be rotated; and an image forming unit which forms on an image formation medium the image data of each original, which has been rotated by the rotating section, or the image data of each original decompressed by the decompression section when the determination section has determined that the image data decompressed by the decompression section is not to be rotated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5 and 6 show rotations and arrangements in a page memory based on original direction detection results;

FIGS. 10 to 13 show the order of access in the page memory;

FIG. 14 is a timing chart of a printing process in a case where the direction of an original is detected in a print standby state;

DETAILED DESCRIPTION OF THE INVENTION

An embodiment of the present invention will now be described with reference to the accompanying drawings.

Figure 1:
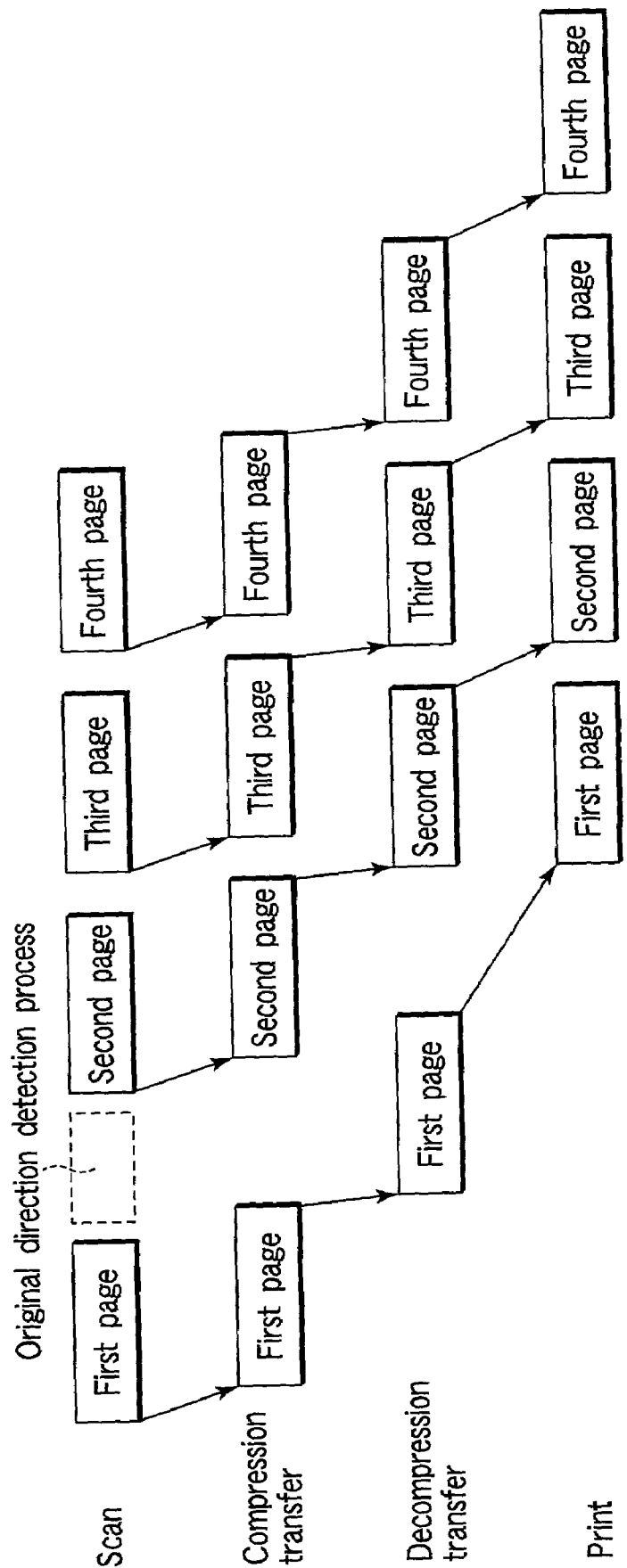
FIG. 1 is a timing chart of data processing in a case where the direction of an original is detected at the time of reading the original.
Figure 2:
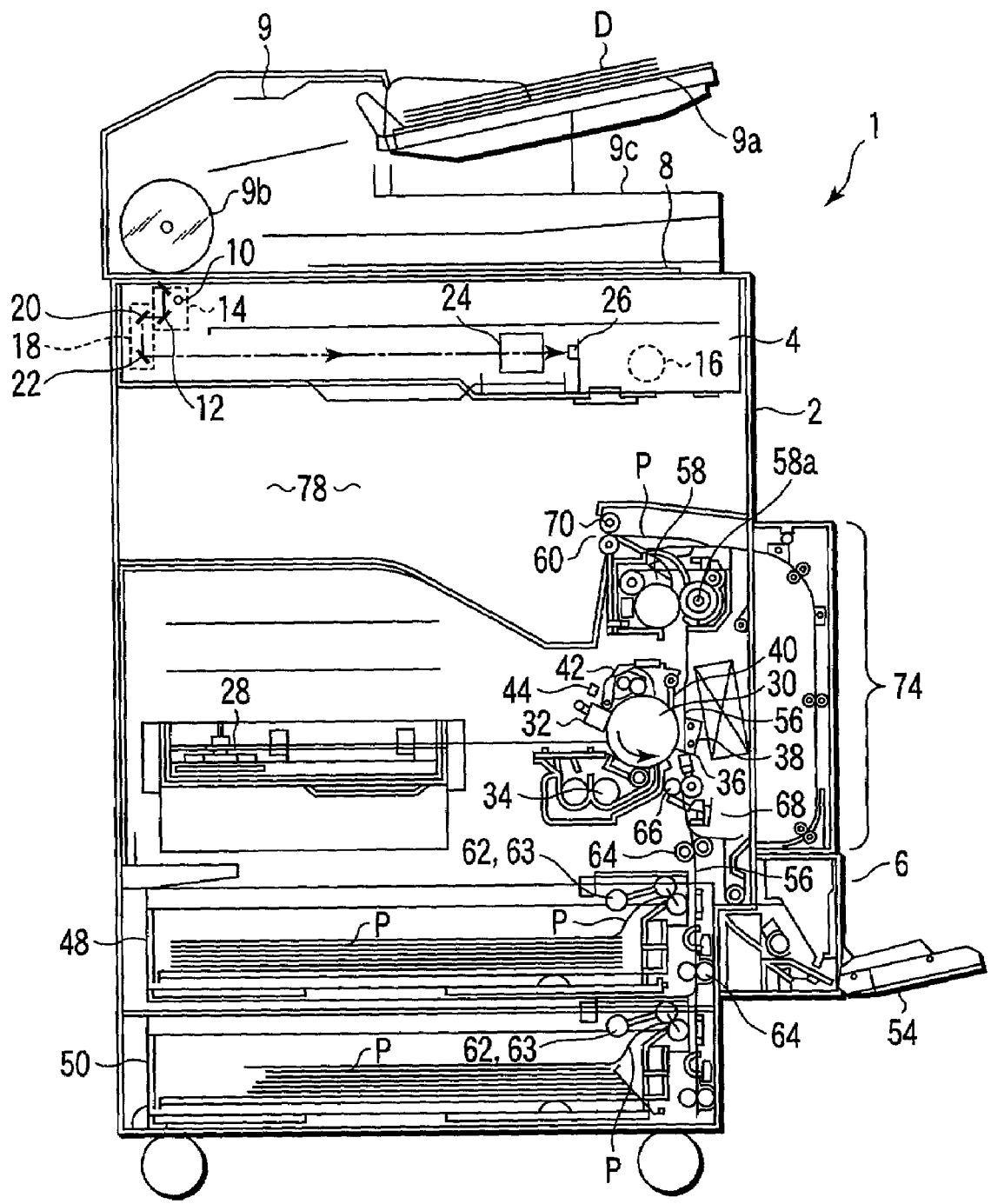
FIG. 2 is a cross-sectional view schematically showing the structure of an image forming apparatus.

FIG. 2 is a cross-sectional view showing a schematic structure of a digital copying machine 1 as an example of an image forming apparatus according to the present invention.

As is shown in FIG. 2, the digital copying machine 1 has an apparatus body 2. The apparatus body 2 includes a scanner unit 4 serving as reading means and a printer unit 6 functioning as image forming means.

An original table 8 formed of transparent glass, on which an object to be read, that is, an original D, is placed, is provided on a top surface of the apparatus body 2. In addition, an automatic original document feeder 9 (hereinafter "ADF") serving as means for automatically feeding the original D onto the original table 8 is provided on the top surface of the apparatus body 2.

The original D placed on an original tray 9a of the ADF 9 is conveyed by a convey guide (not shown) and fed onto a discharge tray 9c via a platen roller 9b. Accordingly, while the original D is being conveyed by the platen roller 9b, it is exposed and scanned by an exposure lamp 10 of the scanner unit 4, as will be described later, and an image on the original D is read.

The originals D are set on the original tray 9a of the ADF 9 such that surfaces to be read of the originals D may face upward. The originals D are successively fed in from the uppermost one.

The scanner unit 4 provided within the apparatus body 2 includes the exposure lamp 10 constituted by, e.g. a halogen lamp, serving as a light source for illuminating the original D fed by the ADF 9 or the original D placed on the original table 8, and a first mirror 12 for deflecting reflection light from the original D to a predetermined direction. The exposure lamp 10 and first mirror 12 are attached to a first carriage 14 disposed below the original table 8.

The first carriage 14 is disposed to be movable in parallel to the original table 8. The first carriage 14 is reciprocally moved under the original table 8 by a scanner motor (drive motor) 16 via a toothed belt, etc. (not shown). The scanner motor 16 is constituted by, e.g. a stepping motor.

A second carriage 18 movable in parallel to the original table 8 is disposed below the original table 8. Second and third mirrors 20, 22 for successively deflecting the reflection light from the original D, which has been reflected by the first mirror 12, are attached to the second carriage 18 such that the second and third mirrors 20, 22 are arranged at right angles with each other. A torque from the scanner motor 16 is transmitted to the second carriage 18 by means of the toothed belt, etc. which drives the first carriage 14, and the second carriage 18 is driven following the first carriage 14. In addition, the second carriage 18 is moved in parallel to the original table 8 at a speed corresponding to ½ of the speed of the first carriage 14.

Moreover, a focusing lens 24 for focusing the reflection light from the third mirror 20 on the second carriage 18 and a CCD sensor (line sensor) 26 for photoelectrically converting the reflection light focused by the focusing lens 24 are disposed below the original table 8. The focusing lens 24 is disposed in a plane including an optical axis of the light deflected by the third mirror 22 so as to be movable by means of a driving mechanism. The focusing lens 24, by its own movement, focuses the reflection light with a desired magnification (main scan direction). The CCD sensor 26 photoelectrically converts the incident reflection light in accordance with an image processing clock delivered from a main CPU (to be described later) and outputs an electric signal corresponding to the read original D. The magnification in a sub-scan direction can be controlled by altering the feed speed of the ADF 9 or the speed of movement of the first carriage 14.

The size of the original is detected on the basis of an output from a detector (not shown) or the CCD sensor 26 provided at the ADF 9. Similarly, the relationship between the longitudinal direction and transverse direction of the original and the main scan direction and sub-scan direction of the CCD sensor 26 is detected.

On the other hand, the printer unit 6 includes a laser exposure device 28 functioning as latent image forming means. A peripheral surface of a photosensitive drum 30 is scanned by a laser beam from the laser exposure device 28 and thus an electrostatic latent image is formed on the peripheral surface of the photosensitive drum 30.

In addition, the printer unit 6 includes the photosensitive drum 30 which is rotatable and serves as an image carrying body. The photosensitive drum 30 is disposed on a right side of an almost central region in the apparatus body 2. The peripheral surface of the photosensitive drum 30 is exposed by the laser beam from the laser exposure device 28 and a desired electrostatic latent image is formed thereon. Around the peripheral surface of the photosensitive drum 30, there are successively provided an electrifying charger 32 for electrifying the drum peripheral surface with a predetermined charge; a developer 34 serving as developing means for supplying toner as developing agent onto the electrostatic latent image formed on the peripheral surface of the photosensitive drum 30 and developing the electrostatic latent image with a desired image density; a transfer charger 38 integrally including a separating charger 36 for separating from the photosensitive drum 30 an image formation medium, i.e. a copying paper sheet P, fed from a cassette 48, 50 (to be described later), the transfer charger 38 functioning to transfer the toner image formed on the photosensitive drum 30 onto the sheet P; a separation gripper 40 for separating the copying paper sheet P from the peripheral surface of the photosensitive drum 30; a cleaner 42 for cleaning the toner remaining on the peripheral surface of the photosensitive drum 30; and a charge eraser 44 for erasing the charge on the peripheral surface of the photosensitive drum 30.

An upper cassette 48 and a lower cassette 50, which are removable from the apparatus body, are disposed in a stacked fashion in a lower region of the apparatus body 2. Copying paper sheets P with different sizes are put in the respective cassettes 48, 50. A manual feed tray 54 is provided on a lateral side of the upper cassette 48.

A convey path 56 is defined within the apparatus body 2, which extends from each cassette 48, 50 through a transfer section provided between the photosensitive drum 30 and transfer charger 38. At a terminal end of the convey path 56, there is provided a fixing device 58 having a fixing lamp 58a. A discharge port 60 is formed at an upper part of the fixing device 58.

A feed roller 62 and a separation roller 63 for taking out paper sheets P one by one from each cassette 48, 50 are provided near each cassette 48, 50. The convey path 56 is provided with a number of feed roller pairs 64 for conveying through the convey path 56 the copying paper sheets P taken out by the feed roller 62 and separation roller 63.

A register roller pair 66 is provided on an upstream side of the photosensitive drum 30 in the convey path 56. The register roller pair 66 corrects a skew of the taken-out copying paper sheet P, aligns a top end of the toner image on the photosensitive drum 30 with a top end of the copying paper sheet P, and feeds the copying paper sheet P to the transfer section at the same speed as the speed of movement of the peripheral surface of the photosensitive drum 30. A pre-aligning sensor 68 for sensing arrival of the copying paper sheet P is provided on an upstream side of the register roller pair 66, that is, on the feed roller 64 side.

The copying paper sheet P taken out from the cassette 48, 50 one by one by means of the feed roller 62 is fed to the register roller pair 66 by means of the feed roller pair 64. After the top end of the copying paper sheet P has been aligned by the register roller pair 66, the copying paper sheet P is fed to the transfer section.

In the transfer section, the developed image, that is, the toner image, formed on the photosensitive drum 30 is transferred onto the sheet P by the transfer charger 38. The copying paper sheet P on which the toner image has been transferred is separated from the peripheral surface of the photosensitive drum 30 by the functions of the separating charger 36 and separation gripper 40. The copying paper sheet P is then conveyed to the fixing device 58 by a convey belt (not shown) constituting a part of the transfer path 56. After the developing agent image is melted and fixed on the copying paper sheet P by the fixing device 58, the copying paper sheet P is discharged by a discharge roller pair 70 onto a discharge tray 72 within the apparatus body 2 through the discharge port 60.

An automatic double-side device 74 for reversing the copying paper sheet P, which has passed through the fixing device 58, and for feeding it to the convey path 56 once again, is provided on a right side of the convey path 56.

An operation panel (to be described later) for instructing various copying conditions, such as copying magnification, and a copying operation start, is provided on an upper front portion of the apparatus body 2.

Figure 3:
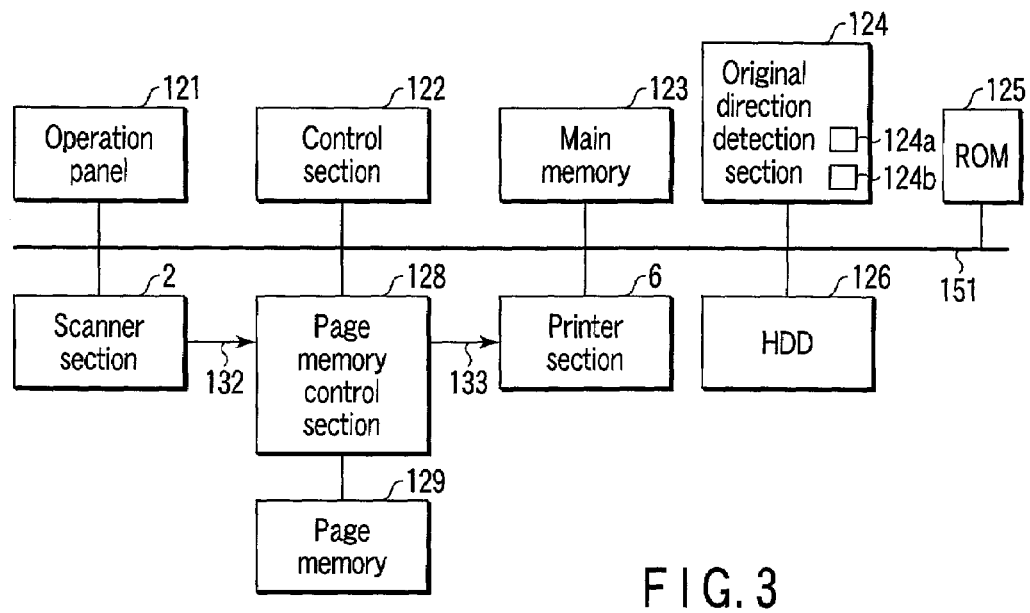
FIG. 3 is a block diagram schematically showing the structure of the image forming apparatus.

The internal structure of a control circuit of the digital copying machine 1 will now be described with reference to FIG. 3.

The digital copying machine 1 is provided with a control section 122 for controlling the entirety of the machine. To the control section 122, connected via a system bus 131 are an operation panel 121, a main memory 123, an original direction detection section 124, a ROM 125, an HDD 126, a page memory control section 128, the scanner unit 2 and printer unit 6.

The ROM 125 stores operational software of the digital copying machine 1.

The main memory 123 temporarily stores image data or other operational data.

The scanner unit 2 reads the original at a predetermined timing, converts the read image data to a digital signal, and sends it to the page memory control section 128 along with a sync signal via a scanner interface 132.

In synchronism with the sync signal from the scanner unit 2, the page memory control section 128 takes in the image data and temporarily stores it in the page memory 129. The page memory control section 128 reads out the image data from the page memory 129, compresses the read-out image data, and stores the compressed image data in the HDD 126 via the system bus 131.

The above-described process relates to the scanning of one original. When there are a plurality of originals, this process is repeated until all originals have been scanned.

The image data stored in the HDD 126 is read out at a predetermined timing and sent to the page memory control section 128 via the system bus 131. After the image data is decompressed in a decompression section (i.e. a decompression transfer channel 139 to be described later), the decompressed data is temporarily developed in a predetermined area of the page memory 129.

Using the image data in the page memory 129, the original direction detection section 124 performs an original direction detection process and determines whether a rotating process should be performed or not.

Based on the detection result of the original direction detection section 124, the page memory control section 128 reads out, in a rotational read mode or a non-rotational read mode, the image data temporarily developed on the page memory 129. The read-out data is re-arranged on another area in the page memory 129, which area is provided for printing.

When images of a plurality of originals are to be printed on a single sheet (N-in-1), the image data of the next original is read out of the HDD 126, and the above process is repeated. The read-out data is developed on a predetermined area in the page memory 129. If the development of the image data to be printed on the single sheet is completed, the control section 122 outputs a printing instruction to the printer unit 6 via the system bus 131.

The printer unit 6 starts printing operations including a sheet feed operation. The printer unit 6 outputs to the page memory control section 128 via the printer interface 133 a sync signal for reading out image data from the page memory 129 at a predetermined timing.

Based on the sync signal, the page memory control section 128 reads out the image data from the page memory 129 and delivers it to the printer unit 6 via the printer interface 133.

When the page memory control section 128 is to read out image data, it performs rotational read-out in accordance with a rotational printing instruction received in advance from the control section 122, and it performs non-rotational read-out in accordance with a non-rotational printing instruction received in advance from the control section 122. In the case of rotational read-out, the image data is delivered to the printer unit 6 while being subjected to a rotating process in the page memory control section 128.

The printer unit 6 forms images on the sheet by an electrostatic recording method.

The printing process will now be described with reference to a flow chart of FIG. 4.

As regards inputting of originals, an original input process starts in accordance with a copying instruction from the operation panel 121. Assume that compressed images have successively been stored in the HDD 126 by the above-described procedure. Thus, a flow of the printing process will be described below.

To start with, the control section 122 initializes a variable N (=1) (ST1). The variable N represents the numerical position of an image now being processed, in a numerical series of images to be printed on a single sheet. For example, in the 2-in-1 mode (images of two originals are to be printed on a single sheet), the variable N varies from 1 to 2.

Following the initialization, the control section 122 instructs the page memory control section 128 to effect image provisional development (ST2). In the image provisional development, the page memory control section 128 reads out the compressed image from the HDD 126. The compressed image, while being decompressed, is temporarily developed on a predetermined position in the page memory 129. The control section 122 determines whether the provisionally developed image data is an image to be printed on a first page of a paper sheet (first sheet) (ST3).

In an ordinary copying mode in which a copied result equal to an original is obtained, the image on the first original alone is determined to be the image to be printed on the first sheet. In the N-in-1 mode, images on the first page to an N-th page are determined to be images to be printed on the first page of the sheet. If the image data is determined to be the image to be printed on the first page of the sheet, the control section 122 performs the original direction detection process (ST4).

In the original direction detection process, character recognition techniques are used to extract character images from bit-map image data developed on the page memory 129 and to character-recognize the character images. Thus, the direction of the original (up, down, left, right) is determined. In addition, based on intervals of character images, vertical description/horizontal description is determined. The direction-of-original detection method is not a main feature of the present invention, and it is not limited to the above-described one. As regards the determination of vertical/horizontal description, the user may set it in advance through the operation panel 121.

A result of original direction detection is stored in an original direction register (N) 124a by means of the control section 122 (ST5). As the detection result, the direction (up, down, left, right) of the original and the vertical/horizontal description are stored. The original direction register N comprises registers corresponding to a maximum number of images to be printed on a single sheet. For example, in the case of a 4-in-1 mode at maximum (i.e. images of four originals are to be printed on a single sheet), the value N is 1–4 and the register (N) 124a comprises four registers for storing the directions of originals.

An original arrangement register 124b is a register for storing data on how a plurality of original images to be printed on a single sheet are arranged. The areas for arrangement is determined based on a direction-of-original detection result relating to originals to be printed on a single sheet. For example, in the case of 2-in-1, after the first two pages have been read, the control section 122 determines the arrangement areas based on the original direction detection result, and stores the determined result in the original arrangement register 124b (ST6). The original arrangement register 124b has the same number of registers as the original direction register 124a. The determination of arrangement of originals will be described later.

Subsequently, the original direction detection result (up, down, left, right) is retrieved from the original direction register (N) 124a, and it is determined whether the rotating process is to be carried out (ST7). Rotational read-out over 180° is carried out only when the original direction detection result indicates "down" or "left" (ST8). If the original direction detection result indicates "up" or "right", non-rotational read-out is effected, and original images are rearranged on areas prepared in the page memory 129 for printing, on the basis of the original arrangement determination result (ST9).

If the original is not an original that is to be printed on the first page of the sheet, the control section 122 does not detect the direction of the original. In accordance with the value in the original direction register 124a based on variable N (ST10), the rotating process/non-rotating process is determined (ST7).

The control section 122 counts up the variable N (ST11). If the image of the next page is an image to be printed on the same sheet (ST12, ST13), the process from the step of reading out the image from HDD 126 (step ST2) is repeated.

On the other hand, in step ST13, when the image of the next page is an image to be printed on a different sheet, the control section 122 initializes the variable N (=1) (ST14) and instructs the page memory control section 128 and printer 27 to start printing (ST15). At the same time, the image is read out of the HDD 126 the process from step ST2 is repeated.

The method of determining arrangement of originals in the N-in-1 mode will now be described with reference to FIGS. 5 and 6.

FIGS. 5 and 6 show an example of the arrangement of originals in the case where 2-in-1 printing is performed, with an original having images on both sides. FIG. 5 relates to an original having a longitudinal direction coinciding with the main scan direction of the original. FIG. 6 relates to an original having a transverse direction coinciding with the main scan direction of the original. The "obverse-page character direction" represents the original direction (up, down, left, right) as a detection result of the direction of the obverse page of the original. Similarly, the "obverse-page horizontal description" represents horizontal description as a detection result of the obverse page of the original. Similarly, the "obverse-page vertical description" represents vertical description as a detection result of the obverse page of the original.

The "reverse-page character direction" represents the original direction (up, down, left, right) as a detection result of the direction of the reverse page of the original. In this case, it is not possible that the reverse page of the original, whose obverse page has been determined to be "up" or "down", is determined to be "left" or "right". Thus, the reverse page of the original, whose obverse page has been determined to be "up" or "down", is determined to be "up" or "down" alone.

In addition, it is not possible that the reverse page of the original, whose obverse page has been determined to be "left" or "right", is determined to be "up" or "down". Thus, the reverse page of the original, whose obverse page has been determined to be "left" or "right", is determined to be "left" or "right" alone.

Figure 4:
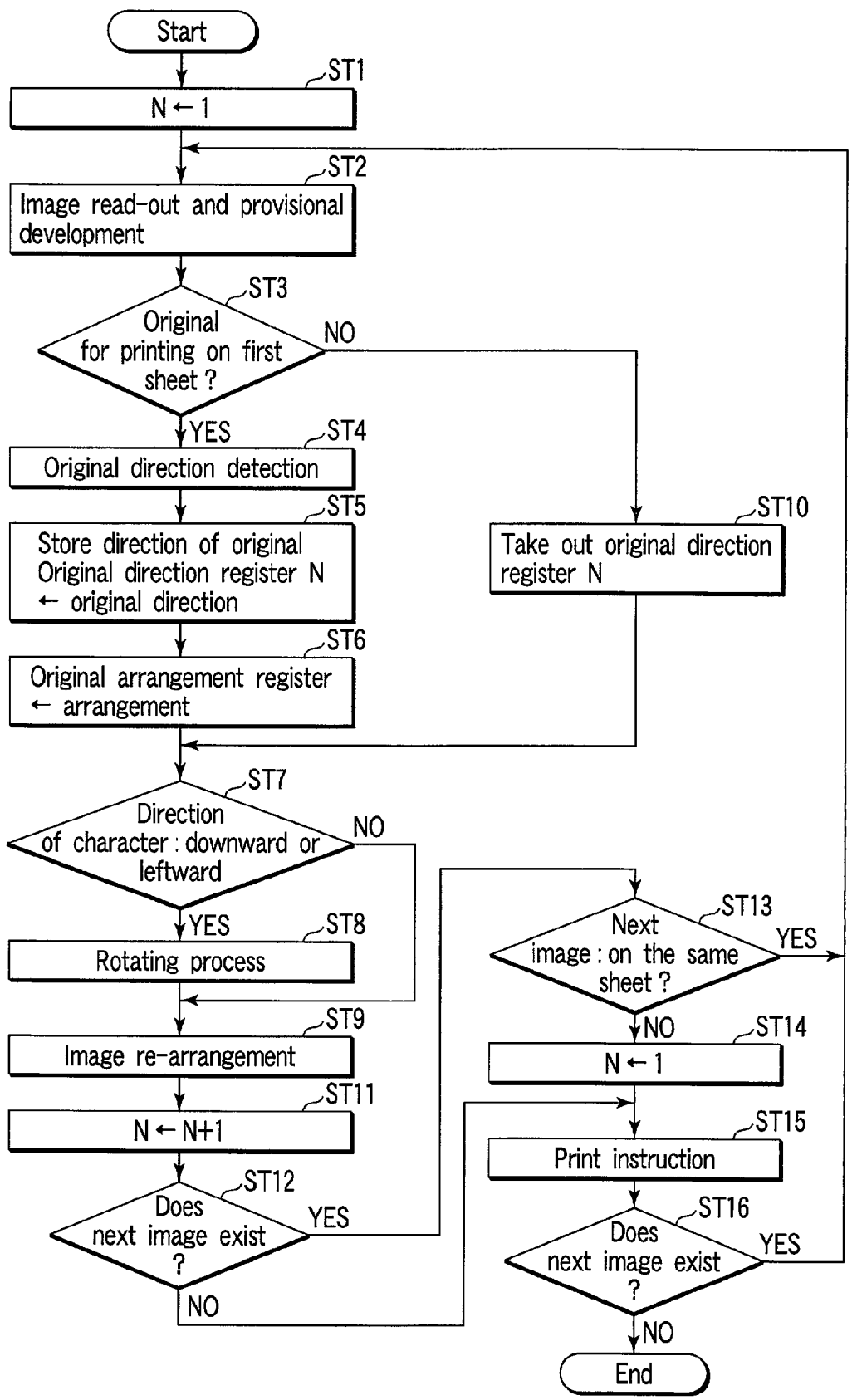
FIG. 4 is a flow chart illustrating a print process.

The "obverse-page rotating process" and "reverse-page rotating process" represent the presence/absence of the rotating process in step ST7 in the flow chart of FIG. 4. The numeral "0" indicates storage in HDD 126 with the non-rotating process, and numeral "180" indicates storage in HDD 126 with the 180° rotating process. As a result of the rotating process, the image is made uniform in the "up" direction or "right" direction and stored in the HDD 126. The "obverse-page 2-in-1 arrangement" and "reverse-page 2-in-1 arrangement" represent the arrangement of images in the page memory 129. Referring to FIG. 5, originals, whose obverse pages have been determined to be "up" or "down", are made uniform in the "up" direction by the rotating process. Irrespective of the vertical description/horizontal description, the obverse page is arranged on the upper side of the page memory 129 shown in FIG. 7, and the reverse page is arranged on the lower side thereof.

Referring to FIG. 5, originals, whose obverse pages have been determined to be "right" or "left", are made uniform in the "right" direction by the rotating process. Accordingly, as regards the vertical-description original, the obverse page is arranged on the lower side of the page memory 129 shown in FIG. 7, and the reverse page is arranged on the upper side thereof. As regards the horizontal-description original, the obverse page is arranged on the upper side of the page memory 129, and the reverse page is arranged on the lower side thereof.

Figure 8:
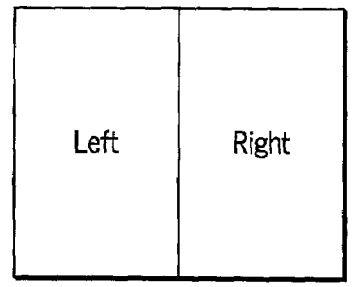

Similarly, referring to FIG. 6, originals, whose obverse pages have been determined to be "up" or "down", are made uniform in the "up" direction by the rotating process. Accordingly, as regards the vertical-description original, the obverse page is arranged on the right side of the page memory 129 shown in FIG. 8, and the reverse page is arranged on the left side thereof. As regards the horizontal-description original, the obverse page is arranged on the left side of the page memory 129, and the reverse page is arranged on the right side thereof.

In FIG. 6, originals, whose obverse pages have been determined to be "right" or "left", are made uniform in the "right" direction by the rotating process. Irrespective of the vertical description/horizontal description, the obverse page is arranged on the right side of the page memory 129 shown in FIG. 8, and the reverse page is arranged on the left side thereof.

The internal structure of the page memory control section 128 will now be described with reference to FIG. 9.

The page memory control section 128 comprises transfer channels (a scanner IF transfer channel 134, a printer IF transfer channel 141, a SYSIF transfer channel 137 and a SYSIF transfer channel 138) for interfacing data transfer between the page memory 129 and other processing blocks; transfer channels (a compression transfer channel 136, an input rotational transfer channel 135, a decompression transfer channel 139 and a printing rotational transfer channel 140) having both interfacing functions and data processing functions; a data transfer control section 142 for mediating data transfer requests from the respective transfer channels and executing data transfer between the page memory 129 and transfer channels, which have been permitted to perform data transfer; and an address generating section 143 for generating addresses of the page memory 129.

The scanner IF transfer channel 134 receives image data of, e.g. 8-pixel unit, from the scanner unit 2 in synchronism with a sync signal output from the scanner unit 2.

Upon receiving 32-pixel image data that is a unit for data transfer with the page memory 129, the scanner IF transfer channel 134 outputs a transfer request to the data transfer control section 142.

In synchronism with a data transfer permission signal that is output from the data transfer control section 142 in response to the transfer request, the scanner IF transfer channel 134 outputs the image data to the data transfer control section 142.

The data transfer control section 142 mediates transfer requests from the respective transfer channels, and determines the transfer channel, which is to be permitted to perform data transfer, in accordance with the order of priority of, e.g. a round robin schedule. In a process of data write from the transfer channel to the page memory 129, the data transfer control section 142 outputs a transfer permission signal to the transfer channel that has been permitted to perform data transfer, and receives image data output from the transfer channel in synchronism with the transfer permission signal.

At the same time, the data transfer control section 142 outputs to the address generating section 143 the number of the transfer channel which was permitted to perform data transfer.

The address generating section 143 has address generating functions for the respective transfer channels, and outputs to the page memory 129 the address of the transfer channel based on the number of the data transfer control section 42 at a predetermined timing. At the same time, the data transfer control section 142 outputs data to the page memory 129.

The rotational and non-rotational access will now be described.

FIGS. 10 to 13 illustrate the orders of access on the page memory 129. FIG. 10 represents the non-rotational access mode in which access is performed from the left to right, and from above downward. Image data input through the scanner IF transfer channel 134 is written in the page memory 129 in the order of access illustrated in FIG. 10. In the case of 180° rotational access, access is performed from the right to left, and from below upward, as illustrated in FIG. 11.

If image data can be input, the compression transfer channel 136 outputs a request to the data transfer control section 142 and receives image data from the page memory 129. The compression transfer channel 136 compresses the image data. If the compressed data can be output (if there is compressed data of a unit (32 bits) capable of being written in the page memory 129), the compression transfer channel 136 outputs to the data transfer control section 142 a request for data write in the page memory 129.

The SYSIF transfer channel 137, 138 interfaces data transfer between the HDD 126 and page memory 129.

If data can be input, the SYSIF transfer channel 137 outputs a transfer request and receives compressed data from the page memory 129. If the compressed data can be output, the SYSIF transfer channel 137 outputs the compressed data to the HDD 126 via the system bus 131 in response to a transfer request from the HDD 126.

If data can be input, the SYSIF transfer channel 138 receives data from the HDD 126 in response to a request from the HDD 126. If there is data input to the transfer channels 135 to 140 by the above-described process, the SYSIF transfer channel 138 outputs a transfer request to the data transfer control section 142 and records the data in the page memory 129.

If data can be input to the transfer channels 135 to 140, the decompression channel 139 delivers an output to the data transfer control section 142. The decompression transfer channel 139 reads out of the page memory 129 the compression data which was written in the page memory 129 from the HDD 126 by the SYSIF transfer channel 138. The read-out compressed data is decompressed according to a predetermined algorithm. If the decompressed data can be output, the decompression channel 139 outputs a request to the data transfer control section 142 and writes the decompressed data in the page memory 129.

The output rotational transfer channel 140 effects read-out with 0° rotation (i.e. non-rotation) or 180° rotation of the image data, which was decompressed by the decompression transfer channel 139 and is temporarily stored in the page memory 129, on the basis of the original direction detection result obtained by the original direction register 124a. Then, on the basis of the result obtained by the original arrangement register 124b, the output rotational transfer channel 140 writes the read-out data in the area for printing in the page memory 129 and rearranges the data.

In the case of non-rotational access, the access as illustrated in FIG. 10 is performed using the common address generated by the address generating section 143 for both the read-out side and write side of the output rotational transfer channel 140.

In the case of rotational access (180°), the page memory 129 is accessed according to the order of access as illustrated in FIG. 11, using the address generated by the address generating section 143 for the read-out side of the output rotational transfer channel 140. The page memory 129 is accessed according to the order of access as illustrated in FIG. 10, using the address generated by the address generating section 143 for the write side of the output rotational transfer channel 140.

Figure 7:
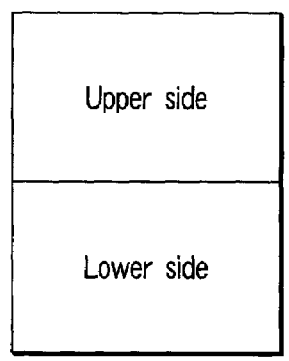
FIGS. 7 and 8 show arrangements in the page memory.

The order of the write in the page memory 129 by the decompression transfer channel 139 corresponds to the non-rotational access illustrated in FIG. 7. In the absence of a rotational print instruction, the printer IF transfer channel 141 reads out the rearranged images in the print area of the page memory 129 in the order of access illustrated in FIG. 10.

In the case where a rotational print instruction has been issued, if it is a 90° rotational print instruction, the printing rotational transfer channel 144 performs the rotational access as illustrated in FIG. 12. Specifically, the page memory 129 is read out from below upward, and from the left to right. Since the access unit of the page memory 129 is 32 bits, the output rotational transfer channel 140 performs vertical/horizontal conversion when the data corresponding to 32 bits×32 lines has been input.

In the case of a 270° rotational print instruction, the rotational access shown in FIG. 13 is performed. Specifically, the image data in the page memory 129 is read out from above downward and from the right to left, and 32×32 vertical/horizontal conversion is effected. Thereafter, the image data is output to the printer unit 6 in synchronism with the sync signal from the printer unit 6.

Figure 9:
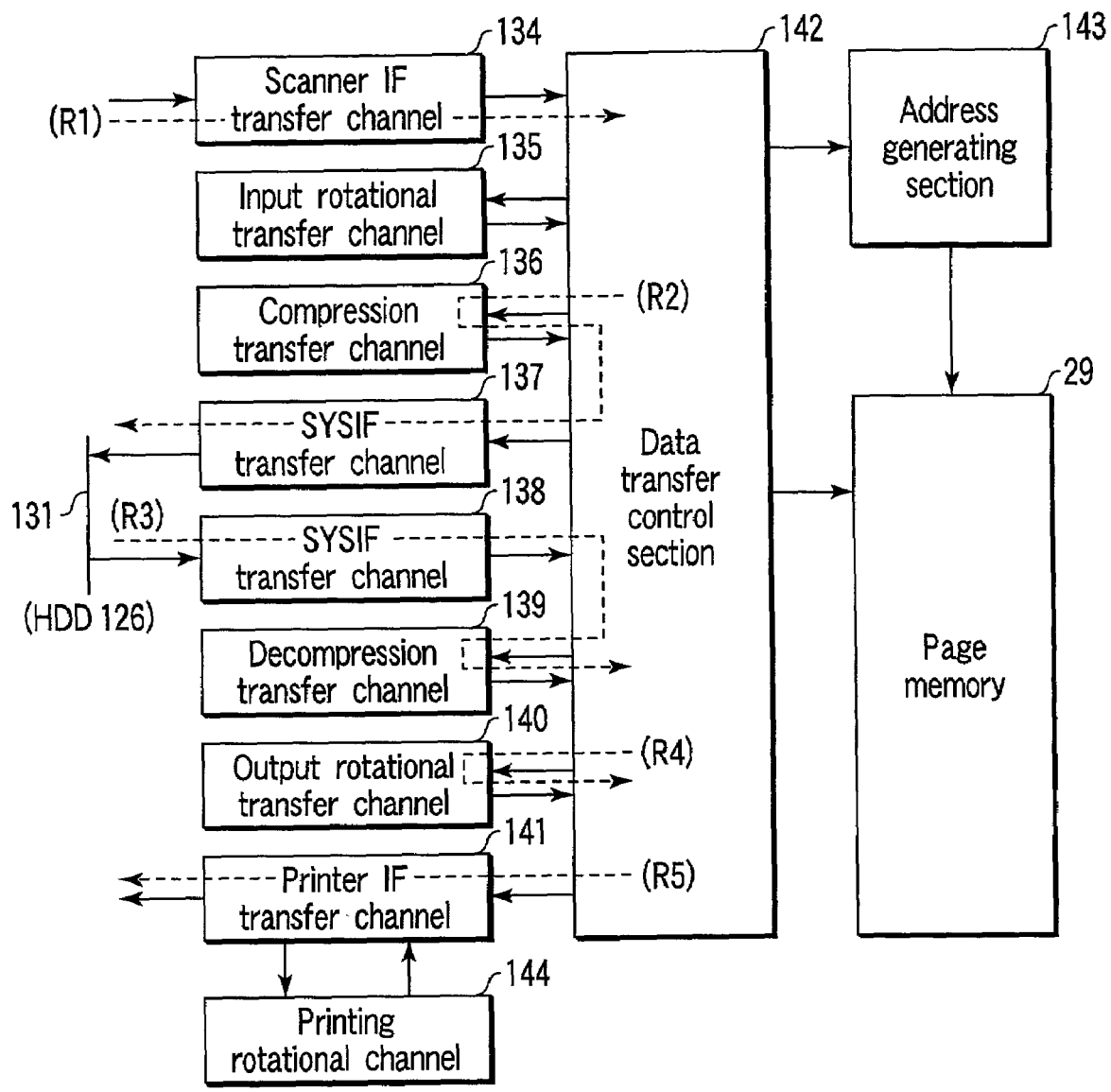
FIG. 9 is a block diagram showing a schematic structure of a page memory control section and process routines.

The 1-in-1 printing process in which the image on a single original is printed on a single paper sheet will now be described with reference to the timing chart of FIG. 14 and the processing flow in the internal structure of the page memory control section 128, as shown in FIG. 9.

To start with, the scanner unit 2 scans the image of the first-page original. The image data is successively supplied from the scanner unit 2 (S1) (R1) and registered in the page memory 129 via the scanner interface 132, scanner IF transfer channel 134 in page memory control section 128, and data transfer control section 142.

The image data registered in the page memory 129 is read out by the data transfer control section 142 and compressed by the compression transfer channel 136. The compressed data is supplied via the SYSIF transfer channel 137 and system bus 131 and registered in the HDD 126 (S2) (R2).

After the image data of the first-page original has been registered in the HDD 126, the image data registered in the HDD 126 is successively read out and supplied and registered (S3) (R3) in the page memory 129 via the system bus 131, SYSIF transfer channel 138 and data transfer control section 142.

The image data registered in the page memory 129 is read out by the data transfer control section 142 and decompressed by the decompression transfer channel 139. Then, the decompressed data is supplied and registered in the page memory 129 (S3) (R3).

When all the image data of the first-page original that was read out of the HDD 126 and decompressed has been developed in the page memory 129, the control section 122 outputs a print instruction to the printer unit 6 via the system bus 131.

Using a wait time (T1) until the printer unit 6 starts printing of the first-page original, the control section 122 causes the original direction detection section 124 to detect the direction of the original on the basis of the decompressed image data of the first-page original developed in the page memory 129 (S4). The result of the original direction detection by the original direction detection section 124, i.e. the result indicating whether the rotating process should be performed or not, is output to the control section 122.

Thereby, the control section 122 outputs to the page memory control section 128 a non-rotation instruction or a rotation instruction on the basis of a detection result of the original direction detection section 124.

In addition, upon receiving a print instruction, the printer unit 6 starts a printing operation for printing on a paper sheet, etc. The printer unit 6 outputs a sync signal for reading out image data from the page memory 129 to the page memory control section 128 via the printer interface 133 at a predetermined timing.

The page memory control section 128, upon receiving a non-rotational printing instruction from the control section 122, reads out to-be-printed image data from the print area of the page memory 129. The page memory control section 128 delivers the read-out data to the printer unit 6 via the printer IF transfer channel 141 and printer interface 133 (S5) (R5). As a result, the printer unit 6 prints out the image data of the first-page original onto a paper sheet without rotation.

In addition, the page memory control section 128, upon receiving a rotational printing instruction from the control section 122, reads out image data of the first-page original temporarily developed on the page memory 129, while rotating the image data using the rotational transfer channel 140. The read-out image data is re-registered on another print area in the page memory 129 (S5) (R4). Thereafter, the page memory control section 128 reads out the re-registered image data for printing from the print area in the page memory 129, and outputs the read-out data to the printer unit 6 via the printer I/F transfer channel 141 and printer interface 133 (S5) (R5). As a result, the printer unit 6 prints out the image data of the first-page original onto a paper sheet, with the image data being rotated.

After the image data of the first-page original has been registered in the HDD 126, the scanner unit 2 starts reading of the second-page original, and the read image data is printed in the same manner as the first-page original. However, the processing relating to the rotation of image data is performed on the basis of the determination result on the first-page original.

FIG. 9 shows a processing timing. Symbol (R1) indicates scanning, (R2) compression transfer, (R3) decompression transfer, and (R5) a printing process flow. The rotation of (R4) represents the rearrangement of image after the original direction detection. This process itself can be performed in a shorter time period than the scanning or printing, and thus this process is included in the decompression transfer.

Accordingly, when the original direction detection is performed at the time of scanning the original as in the prior art, the original direction detection intervenes between the first-page scan and the second-page scan and, consequently, the scanning performance deteriorates.

By contrast, in the present invention, the original direction detection is effected using the time that is needed for the paper feed operation, the stabilization of the electrophotographic process, etc. until the substantial printing operation is performed. Therefore, the scanning performance does not deteriorate.

As has been described above, the time-consuming character recognition process is performed only for the original, whose image is to be printed on the first sheet. In addition, the character recognition process is performed not at the time of scanning the original, but at the time of printing. Thus, the character recognition process is assigned to the excess time until the printing process is stabilized or the paper feed is completed. Therefore, the original scanning performance is not degraded at all.

At the time of printing, based on the size and direction of the original, the control section 122 determines the size and direction of a paper sheet to be used for printing, and selects the sheet feed cassette accordingly.

Figure 15:
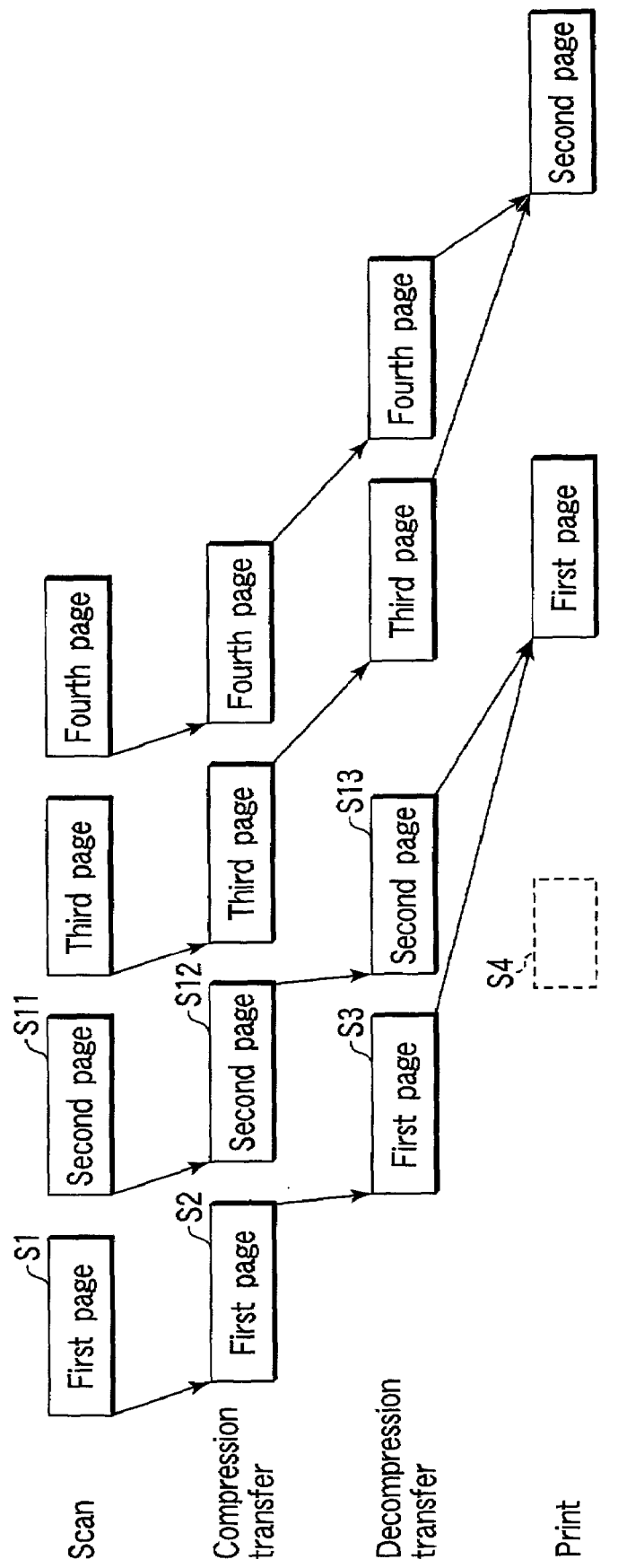
FIG. 15 is a timing chart of a printing process in a 2-in-1 mode.

The 2-in-1 printing process in which two original images are printed on a paper sheet will now be described with reference to the timing chart of FIG. 15 and the processing flow in the internal structure of the page memory control section 128, as shown in FIG. 9.

To start with, the scanner unit 2 scans the image of the first-page original. The image data is successively supplied from the scanner unit 2 (S1) (R1) and registered in the page memory 129 via the scanner interface 132, scanner IF transfer channel 134 in page memory control section 128, and data transfer control section 142.

The image data registered in the page memory 129 is read out by the data transfer control section 142 and compressed by the compression transfer channel 136. The compressed data is supplied via the SYSIF transfer channel 137 and system bus 131 and registered in the HDD 126 (S2) (R2).

After the image data of the first-page original has been registered in the HDD 126, the image data registered in the HDD 126 is successively read out and supplied and registered (S3) (R3) in the page memory 129 via the system bus 131, SYSIF transfer channel 138 and data transfer control section 142.

The image data registered in the page memory 129 is read out by the data transfer control section 142 and decompressed by the decompression transfer channel 139. Then, the decompressed data is supplied and registered in the page memory 129 (S3) (R3) as first-page image data in the 2-in-1 mode.

The control section 122 causes the original direction detection section 124 to detect the direction of the original on the basis of the decompressed image data of the first-page original developed in the page memory 129 (S4). The result of the first-page original direction detection by the original direction detection section 124 is output to the control section 122.

After the image data of the first-page original has been registered in the HDD 126, the scanner unit 2 starts reading of the second-page original. The image data is successively supplied from the scanner unit 2 (S11) (R1) and registered in the page memory 129 via the scanner interface 132, scanner IF transfer channel 134 in page memory control section 128, and data transfer control section 142.

The image data registered in the page memory 129 is read out by the data transfer control section 142 and compressed by the compression transfer channel 136. The compressed data is supplied via the SYSIF transfer channel 137 and system bus 131 and registered in the HDD 126 (S12) (R2).

After the image data of the second-page original is registered, the image data registered in the HDD 126 is successively read out and registered in the page memory 129 (S13) (R3) via the system bus 131, SYSIF transfer channel 138 and data transfer control section 142.

The image data registered in the page memory 129 is read out by the data transfer control section 142 and decompressed by the decompression transfer channel 139. Then, the decompressed data is supplied and registered in the page memory 129 (S13) (R3) as second-page image data in the 2-in-1 mode.

When all the image data of the second-page original that was read out of the HDD 126 and decompressed has been developed in the page memory 129, the control section 122 outputs a print instruction to the printer unit 6 via the system bus 131.

In addition, the control section 122 outputs to the page memory control section 128 a non-rotation instruction or a rotation instruction for the first-page and second-page image data on the basis of a direction detection result of the first-page original.

In addition, upon receiving a print instruction, the printer unit 6 starts a printing operation for printing on a paper sheet, etc. The printer unit 6 outputs a sync signal for reading out image data from the page memory 129 to the page memory control section 128 via the printer interface 133 at a predetermined timing.

Thereby, the page memory control section 128, upon receiving a rotational printing instruction from the control section 122, reads out image data of the first-page or second-page original temporarily developed on the page memory 129, while rotating the image data using the rotational transfer channel 140. The read-out image data is re-registered on another print area in the page memory 129 (S7) (R4).

Thereafter, the page memory control section 128 reads out the image data for the 2-in-1 printing from the print area in the page memory 129, and outputs the read-out data to the printer unit 6 via the printer I/F transfer channel 141 and printer interface 133 (S7) (R5). As a result, the printer unit 6 prints out the 2-in-1 image data of the first-page original and second-page original onto a paper sheet, with the directions of characters being made to coincide.

After the image data of the second-page original has been registered, the scanner unit 2 successively reads the third-page and fourth-page originals, and the 2-in-1 printing is effected as in the same manner as with the first-page and second-page originals. However, the rotation of the image data is determined based on the original direction and the print position determined in connection with the first-page original.

Accordingly, when the 2-in-1 printing is effected, the original direction of the first-page original is detected in the process of scanning the second-page original. Therefore, the scanning performance does not deteriorate.

Figure 16:
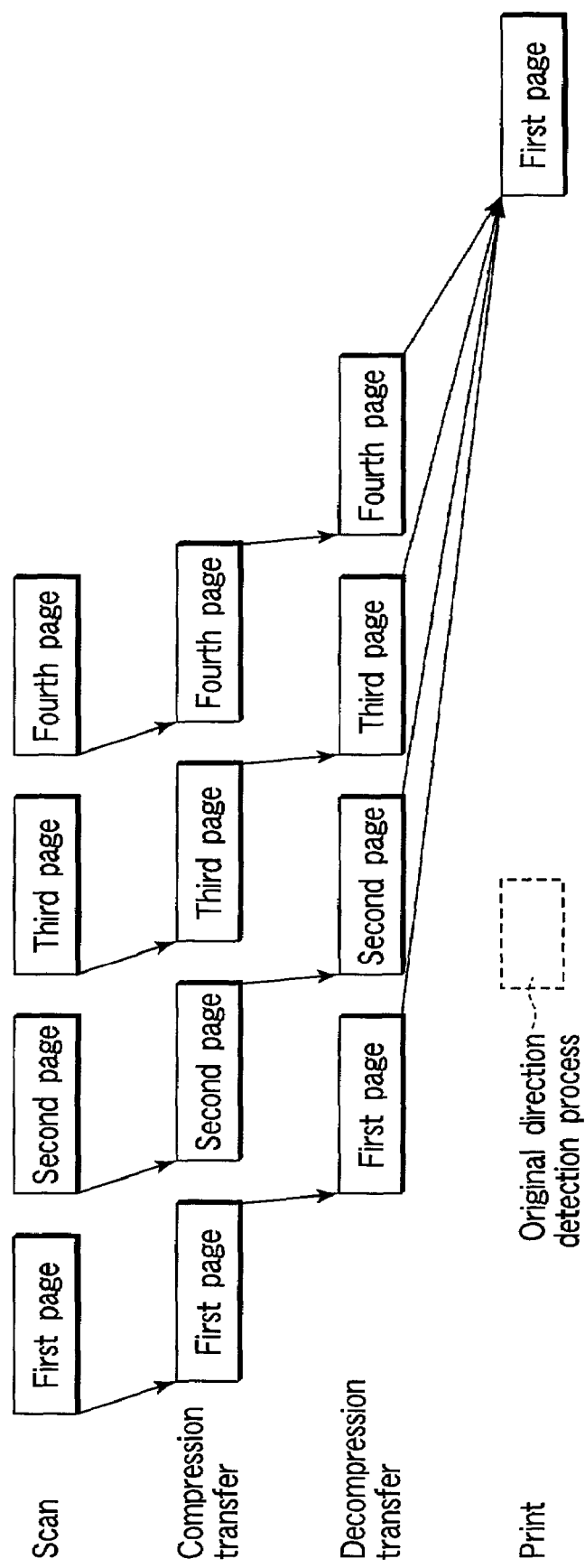
FIG. 16 is a timing chart of a printing process in a 4-in-1 mode.

Moreover, the 4-in-1 printing, as shown in FIG. 16, can be performed in the same manner as with the 2-in-1 printing. Since the original direction of the first-page original is detected in the process of scanning the second-page original, the scanning performance does not deteriorate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
    a scanner unit which successively scans image data of each of a plurality of originals;
    a compression section which compresses the image data scanned by the scanner unit;
    a hard disk which stores the image data compressed by the compression section;
    a decompression section which decompresses the image data stored in the hard disk;
    a detection section which detects the direction of the original on the basis of the image data of a first one of the originals, which has been decompressed by the decompression section and scanned by the scanner section;
    a determination section which determines whether the image data decompressed by the decompression section is to be rotated or not, on the basis of a detection result of the detection section;
    a rotating section which rotates the image data of each original decompressed by the decompression section, when the determination section has determined that the image data decompressed by the decompression section is to be rotated; and
    an image forming unit which forms on an image formation medium the image data of each original, which has been rotated by the rotating section, or the image data of each original decompressed by the decompression section when the determination section has determined that the image data decompressed by the decompression section is not to be rotated,
    wherein the image data scanned by the scanner unit is pixel-unit image data relating to pixels in a main scan direction and a sub-scan direction of first to Nth ones of said originals, copy images of image data of the first to Nth originals are formed on the same surface of the image formation medium, said detection section detects the directions of the first to Nth originals on the basis of the image data of the first original, and said determination section determines whether the image data of the first to Nth originals, which has been decompressed by the decompression section, is to be rotated or not, on a detection result of said detection section and image formation positions on the image formation medium.

2. An image forming apparatus according to claim 1, wherein said detection section includes a recognition section which recognizes characters appearing on the image data decompressed by the decompression section, and the direction of the original is detected on the basis of the direction of the characters recognized by the recognition section.

3. An image forming apparatus according to claim 1, wherein said detection section includes a recognition section which recognizes characters appearing on the image data decompressed by the decompression section, and an up-and-down direction of the original is detected on the basis of whether the direction of the characters recognized by the recognition section is a normal direction or an inverted direction.

4. An image forming apparatus according to claim 1, wherein said detection section includes a recognition section which recognizes characters appearing on the image data decompressed by the decompression section, and a discrimination section which discriminates between vertical description and horizontal description on the basis of the direction and intervals of the characters recognized by the recognition section, and the direction of the original is detected on the basis of the direction of the characters recognized by the recognition section and the vertical/horizontal description discriminated by the discrimination section.

5. An image forming apparatus according to claim 1, wherein the image data scanned by the scanner unit is pixel-unit image data relating to pixels in a main scan direction and a sub-scan direction.

6. An image forming apparatus according to claim 1, wherein said scanner unit includes a scan section which scans in a main scan direction of the original, a moving section which relatively moves the scan section in a sub-scan direction of the original, and an original detection section which detects a longitudinal direction and a transverse direction of the original, and said detection section detects the direction of the original on the basis of the main scan direction and sub-scan direction of the original and the longitudinal direction and transverse direction detected by the original detection section.

7. An image forming apparatus according to claim 1, further comprising a page memory which temporarily stores the image data read by the scanner unit, the image data compressed by the compression section, the image data read out of the hard disk, and the image data decompressed by the decompression section.

8. An image forming apparatus according to claim 1, wherein the image data scanned by the scanner unit is pixel-unit image data relating to pixels in a main scan direction and a sub-scan direction of first and second ones of said originals, and copy images of image data of the first and second originals are formed on the same surface of the image formation medium.

9. An image forming apparatus according to claim 1, wherein the image data scanned by the scanner unit is pixel-unit image data relating to pixels in a main scan direction and a sub-scan direction of first and second ones of said originals, copy images of image data of the first and second originals are formed on the same surface of the image formation medium, said detection section detects the directions of the first and second originals on the basis of the image data of the first original, and said determination section determines whether the image data of the first and second originals, which has been decompressed by the decompression section, is to be rotated or not, on a detection result of said detection section.

10. An image forming apparatus according to claim 1, wherein the image data scanned by the scanner unit is pixel-unit image data relating to pixels in a main scan direction and a sub-scan direction of first to Nth ones of said originals, and copy images of image data of the first to Nth originals are formed on the same surface of the image formation medium.

11. An image forming method comprising:
successively scanning image data of each of a plurality of originals;
compressing the image data scanned in the scanning step;
storing, in a hard disk, the image data compressed in the compressing step;
decompressing the image data stored in the hard disk;
detecting the direction of the original on the basis of the image data of a first one of the originals, which has been decompressed in the decompressing step and scanned in the scanning step;
determining whether the image data decompressed in the decompressing step is to be rotated or not, on the basis of a detection result of the detecting step;
rotating the image data of each original decompressed in the decompressing step, when the determining step has determined that the image data decompressed in the decompressing step is to be rotated; and
forming on an image formation medium the image data of each original, which has been rotated in the rotating step, or the image data of each original decompressed in the decompressing step when the determining step has determined that the image data decompressed in the decompressing step is not to be rotated,
wherein the image data scanned in the scanning step is pixel-unit image data relating to pixels in a main scan direction and a sub-scan direction of first to Nth ones of said originals, copy images of image data of the first to Nth originals are formed on the same surface of the image formation medium, the detection step detecting the directions of the first to Nth originals on the basis of the image data of the first original, and the determining step determining whether the image data of the first to Nth originals, which has been decompressed in the decompressing step, is to be rotated or not, on a detection result of the detecting step and image formation positions on the image formation medium.

12. An image forming method according to claim 11, wherein the detecting step includes a recognizing step which recognizes characters appearing on the image data decompressed in the decompressing step, and the direction of the original is detected on the basis of the direction of the characters recognized in the recognizing step.

13. An image forming method according to claim 11, wherein the detecting step includes a recognizing step which recognizes characters appearing on the image data decompressed in the decompressing step, and an up-and-down direction of the original is detected on the basis of whether the direction of the characters recognized in the recognizing step is a normal direction or an inverted direction.

14. An image forming method according to claim 11, wherein the detecting step includes a recognizing step which recognizes characters appearing on the image data decompressed in the decompressing step, and a discriminating step which discriminates between vertical description and horizontal description on the basis of the direction and intervals of the characters recognized in the recognizing step, and the direction of the original is detected on the basis of the direction of the characters recognized in the recognizing step and the vertical/horizontal description discriminated in the discriminating step.

15. An image forming method according to claim 11, wherein the image data scanned in the scanning step is pixel-unit image data relating to pixels in a main scan direction and a sub-scan direction.

16. An image forming method according to claim 11, wherein the scanning step comprises scanning by a scan section in a main scan direction of the original, relatively moving the scan section in a sub-scan direction of the original, and detecting a longitudinal direction and a transverse direction of the original, wherein the detecting step detects the direction of the original on the basis of the main scan direction and sub-scan direction of the original and the longitudinal direction and transverse direction.

17. An image forming method according to claim 11, further comprising temporarily storing, in a page memory, the image data read in the scanning step, the image data compressed in the compressing step, the image data read out of the hard disk, and the image data decompressed in the decompressing step.

18. An image forming method according to claim 11, wherein the image data scanned in the scanning step is pixel-unit image data relating to pixels in a main scan direction and a sub-scan direction of first and second ones of said originals, and copy images of image data of the first and second originals are formed on the same surface of the image formation medium.

19. An image forming method according to claim 11, wherein the image data scanned in the scanning step is pixel-unit image data relating to pixels in a main scan direction and a sub-scan direction of first and second ones of said originals, copy images of image data of the first and second originals are formed on the same surface of the image formation medium, wherein the detecting step detects the directions of the first and second originals on the basis of the image data of the first original, and the determining step determines whether the image data of the first and second originals, which has been decompressed in the decompressing step, is to be rotated or not, on a detection result of the detecting step.

20. An image forming method according to claim 11, wherein the image data scanned in the scanning step is pixel-unit image data relating to pixels in a main scan direction and a sub-scan direction of first to Nth ones of said originals, and copy images of image data of the first to Nth originals are formed on the same surface of the image formation medium.

* * * * *